Figure 6:
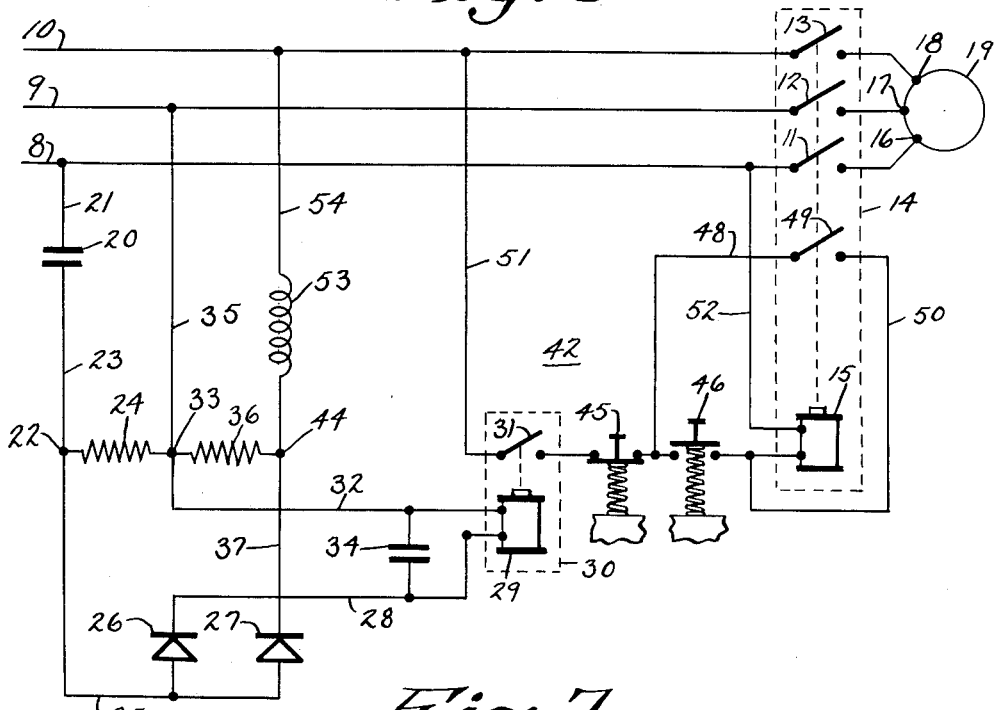

March 14, 1961 — J. E. CALLAN — 2,975,334
PHASE FAILURE AND PHASE REVERSAL PROTECTIVE CIRCUIT
Filed Feb. 6, 1958 — 2 Sheets-Sheet 1
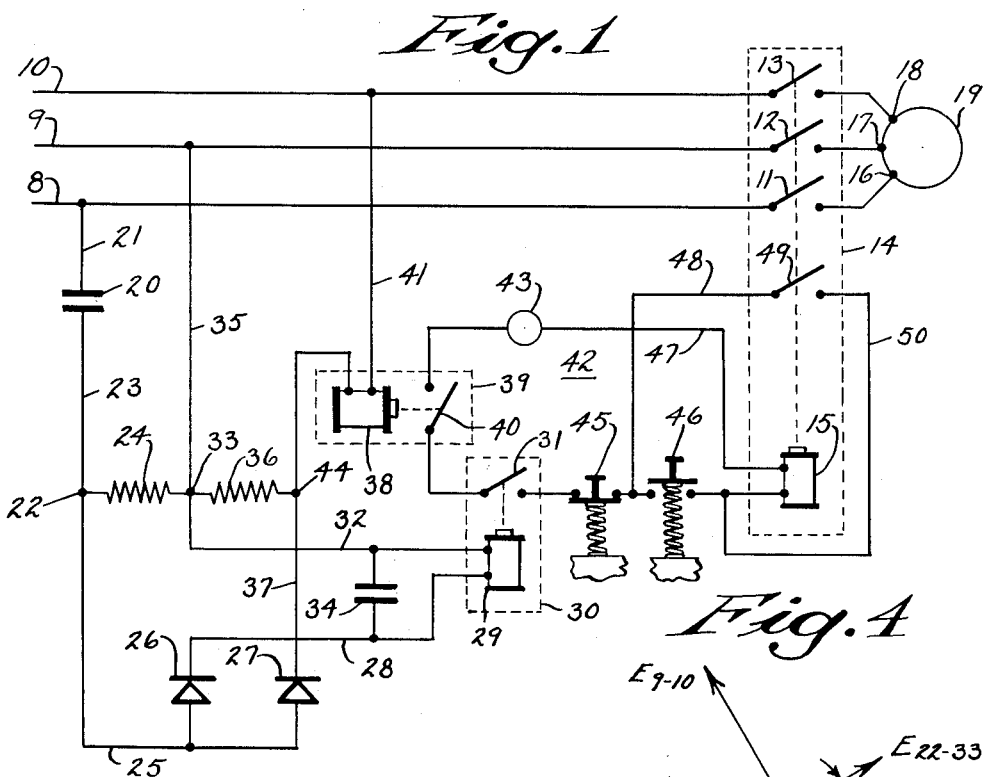
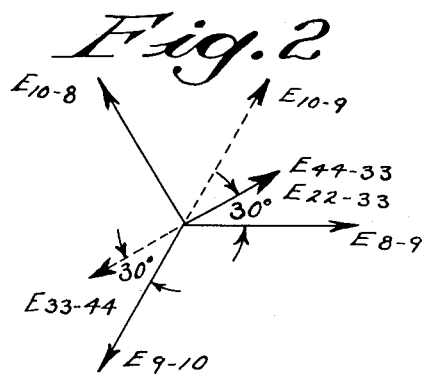
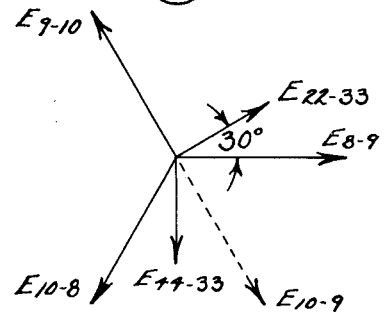
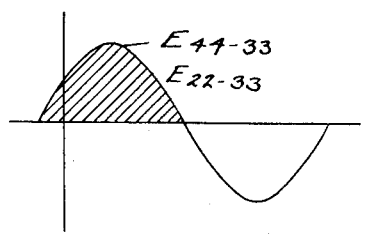
INVENTOR
JOHN E. CALLAN
BY Quarles, Fox, Seidel,
Bateman & Hoar
ATTORNEYS March 14, 1961   J. E. CALLAN   2,975,334
PHASE FAILURE AND PHASE REVERSAL PROTECTIVE CIRCUIT
Filed Feb. 6, 1958   2 Sheets-Sheet 2

INVENTOR
JOHN E. CALLAN

BY Quarles, Fox, Seidel,
Bateman + Hoar
ATTORNEYS

United States Patent Office 2,975,334
Patented Mar. 14, 1961

2,975,334

PHASE FAILURE AND PHASE REVERSAL PROTECTIVE CIRCUIT

John E. Callan, Milwaukee, Wis., assignor to Allen-Bradley Company, Milwaukee, Wis., a corporation of Wisconsin Filed Feb. 6, 1958, Ser. No. 713,749

8 Claims. (Cl. 317—48)

This invention relates to a protective circuit for a polyphase electrical system. More specifically it resides in a phase failure and phase reversal protective circuit having a pair of phase shifting networks that present a pair of voltages each shifted in time with respect to a phase of a power source whereby the relative time displacement between the two voltages is indicative of the phase sequence of such power source, the circuit further includes a pair of rectifiers that are connected across the phase shifting networks to admit an energizing current to a relay coil that is sufficient to actuate associated relay contacts when proper phase sequence is present to thereby control the equipment of the polyphase system, and further the rectifiers are adapted to limit the energizing current available to the control relay when unbalanced voltages or voltages of an unwanted sequence are supplied to the system.

Devices for the protection of polyphase equipment frequently include current sensitive coils in the form of transformer primary windings permanently connected into the lines of the polyphase source. Such devices have inherently high power consumption characteristics and must be designed with particular circuit elements according to the power rating of the equipment to be protected.

In the present invention the amount of power consumed by the circuit during operation is minimal, and further an apparatus embodying the invention may be designed for application to a variety of equipment, without requiring alteration of the circuit components. The circuit includes a pair of phase shifting networks connected across two phases of the polyphase power source, such that a voltage drop is produced across each of the networks which is out of phase with the power line voltage with which it is associated. If the two power line voltages are in proper phase sequence the two phase shifted voltages of the phase shifting networks will be substantially in phase with one another, however, if the power line voltages are of improper phase sequence the phase shifted voltages will be substantially out of phase with one another. The invention further includes a pair of rectifiers connected across the two phase shifted voltages in a manner such that the current flow per cycle through one of the rectifiers is indicative of the phase relation of the power source voltages. When the source voltages are of a proper sequence the current conducted by the rectifier is sufficient to energize the coil of a control relay connected in series therewith, whereupon a connection between the protected equipment and the power source is effectuated by means of the relay operation. In the event of a phase sequence reversal the current flow through the rectifier is reduced considerably and the control relay is adapted to either immediately operate to disconnect the protected equipment from the power source, or to delay its response until the equipment is disconnected by other means, after which time the control relay is effective to prevent a reconnection of the equipment to the power source until the phase sequence relationship is corrected.

In the invention, phase failures are detected by various means depending upon the source phase in which the failure occurs and the specific embodiment of the invention. These means will be discussed hereinafter in connection with the operation of the circuit.

It is an object of this invention to provide a phase failure and phase reversal protective circuit having nominal power requirements.

Another object of this invention is to provide a protective circuit which may be applied to polyphase equipment of various power ratings without alteration or modification of the circuit.

A further object of this invention is to provide a protective circuit capable of immediate operation in response to either a phase failure or phase reversal to disconnect the protected system from the power source.

A further object of this invention is to provide a protective circuit capable of delayed operation whereby the protected system may be made to continue in operation after a phase reversal or a phase failure until the system is disconnected by other means, whereupon the circuit serves to prevent a reconnection of the protected system with the power source.

A still further object of this invention is to provide a simply constructed phase failure and phase reversal protective circuit that embodies inexpensive commercial rectifiers and impedances.

The foregoing objects being illustrative only are not delimitative of this invention and other objects and advantages will be apparent from a reading of the following description in connection with the accompanying drawings which form a part hereof, and in which for purposes of illustration there is shown preferred embodiments of the invention. It is understood that the invention is capable of embodiment in other forms falling within the scope of the appended claims.

In the drawings, in which like numerals are employed to designate like parts throughout the same.

Figure 7:
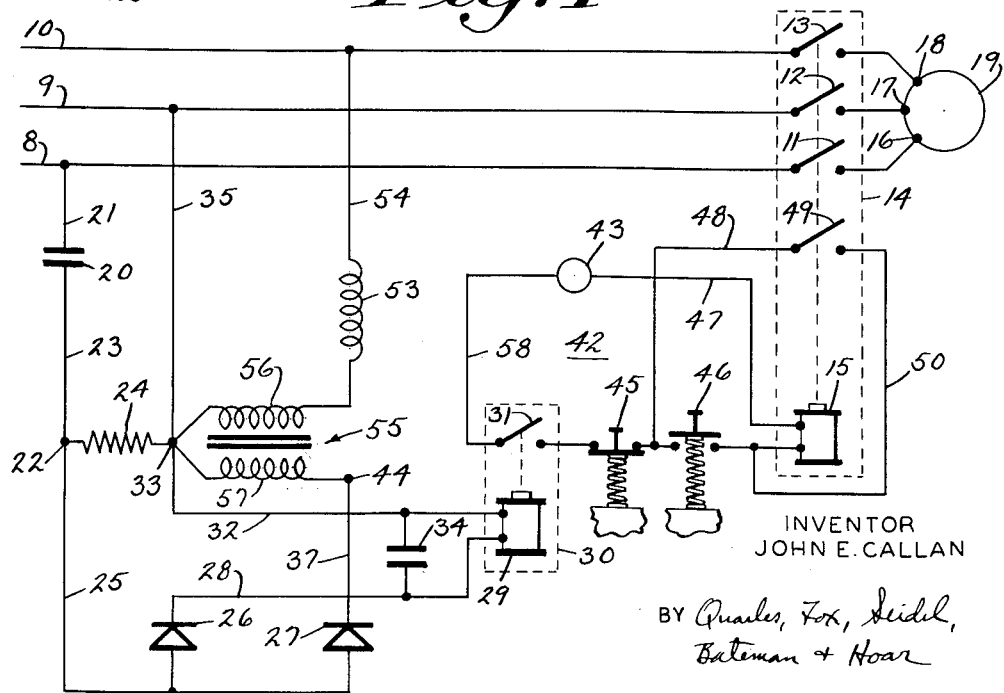

Fig. 1 is a schematic wiring diagram of one form of protective circuit embodying the invention, Fig. 2 is a vector diagram showing voltages that may be present in the circuit of Fig. 1, Fig. 3 is a graph depicting certain voltages that are shown in Fig. 2, Fig. 4 is a vector diagram of voltages that may be present in the circuit of Fig. 1 when the source voltage phase sequence differs from that shown in Fig. 2, Fig. 5 is a graph of certain voltages that are shown in Fig. 4, Fig. 6 is a schematic wiring diagram of another form of protective circuit embodying the invention, and Fig. 7 is a schematic wiring diagram of still another circuit embodying the invention.

Referring now to Fig. 1, there is shown a set of power lines 8, 9 and 10 which lead from a voltage source, not shown, to a set of normally open contacts 11, 12 and 13 of an electromagnetic line switch 14. The contacts 11, 12 and 13 are moved between open and closed positions in response to energization and deenergization of a coil 15 forming a part of the switch 14, and when closed connect the input terminals 16, 17 and 18 of an induction motor 19 to the power lines 8, 9 and 10, respectively. The induction motor 19 shown and described herein is illustrative of but one form of equipment or system which may be protected by the circuits of this invention, and it is to be understood that other polyphase equipment or systems may be protected by the circuits to be described.

One side of a phase shift capacitor 20 is joined through a lead 21 to power line 8, and is joined at its other side by a lead 23 to one end of a resistor 24. The connection between the resistor 24 and the lead 23 is designated as a junction point 22, and the resistor 24 together with the capacitor 20 constitute a phase shifting network. From the junction point 22 a lead 25 extends to one side of a rectifier 26, as well as to a like side of a second rectifier 27. The side of rectifier 26 opposite the connection with the lead 25 is connected through a lead 28 to one terminal of a relay coil 29 forming a part of a control relay 30. The relay 30 has a set of normally open contacts 31 which move to closed position upon sufficient excitation of the coil 29. From a second terminal of coil 29 a lead 32 connects with the end of resistor 24 opposite the junction point 22, and this connection between resistor 24 and lead 32 is herein referred to as junction point 33.

A wave smoothing capacitor 34 is shown connected between leads 28 and 32 and in parallel with relay coil 29.

From junction point 33 a lead 35 extends to a connection with the power line 9. Also connected to the point 33 is one end of a resistor 36.

The side of rectifier 27, opposite the connection with the lead 25, is joined by a lead 37 to a junction point 44 that is at the end of the resistor 36 opposite the junction point 33. Also connected to the junction point 44 is one terminal of a relay coil 38 forming a part of a current relay 39. The relay coil 38 and the resistor 36 constitute a second phase shifting network, and the relay 39 is provided with normally open contacts 40 that may be operated into closed position upon sufficient excitation of its coil 38. The other terminal of the coil 38 is connected to the power line 10 by means of a lead 41.

Excitation for the line switch coil 15 is provided by an excitation circuit 42 adapted to connect a voltage supply 43 across the coil 15. The circuit 42 places normally open relay contacts 31 and 40, a normally closed stop push button 45, and a normally open start push button 46 in series connection between one terminal of the line switch coil 15 and the voltage source 43. The other terminal of the coil 15 is connected through a lead 47 directly to the voltage source 43. A lead 48 is connected immediately adjacent one terminal of the start button 46 and extends to one side of a set of normally open contacts 49 of the line switch 14. The other side of the contacts 49 are joined through a lead 50 to the side of the start button 46 opposite that connected with the lead 48, thus the start button 46 and line switch contacts 49 are in parallel relation.

In Figs. 2 and 4 there are shown rotating vector representations of the alternating phase voltages of the power source which are designated as $E_{8-9}$, $E_{9-10}$, and $E_{10-8}$. These are the phase voltages between power lines 8 and 9, 9 and 10, and 10 and 8, respectively. In addition there are shown rotating vector representations of the voltages between junction points 44 and 33, and junction points 22 and 33, which voltages are designated as $E_{44-33}$ and $E_{22-33}$, respectively. Figs. 3 and 5 graphically illustrate the voltages $E_{44-33}$ and $E_{22-33}$ for a complete cycle of alternation, wherein for the purpose of the illustration the effects on the wave shape due to rectifier conduction are disregarded. The relation of these voltages to the operation of the apparatus will be hereinafter described.

In Figs. 6 and 7 there are shown two further embodiments of the invention, and elements of the circuits in these embodiments that are like those shown in Fig. 1 are identified by like numerals. The circuit illustrated in Fig. 6, which is quite similar to that of Fig. 1, differs by reason of the incorporation of two principal modifications. The voltage supply 43 in the excitation circuit 42 of Fig. 1 is shown to be replaced in the circuit of Fig. 6 by direct connections to power lines 8 and 10. Such connections are accomplished by means of a lead 51 between the control relay contacts 31 and the power line 10, and a lead 52 connected between the line switch coil 16 and the power line 8. The other principal modification is the elimination of the current relay 39, and the substitution of a reactance coil 53, which functions with the resistor 36 as a phase shifting network. The coil 53 is connected at one side by a lead 54 to the power line 10, and at the other side to the junction point 44.

In the circuit illustrated in Fig. 7 it can be seen that the reactance coil 53 and the attached lead 54 shown in Fig. 6 are utilized, while the resistor 36 is eliminated and a transformer 55 substituted therefor. Transformer 55 consists of a primary winding 56 connected at one end to the reactance coil 53 and to the junction point 33 at its other end, and a secondary winding connected to junction point 33 at one side and to lead 37 at its opposite side. This point of connection between secondary winding 57 and the lead 37 is again designated junction point 44. The voltage supply 43 is connected in the excitation circuit 42 substantially as described in connection with the circuit of Fig. 1, except that a lead 58 is connected directly between voltage supply 43 and relay contacts 31, such that the contacts 40 associated with relay 39 in Fig. 1 are eliminated.

The operation of the circuit shown in Fig. 1 is as follows. When balanced A.-C. voltages are impressed upon the power lines 8, 9 and 10 an energizing current is caused to flow through coil 38 of current relay 39, and current flow will also occur through lead 35, phase shift capacitor 20 and the interconnecting resistors 24, 36. In response to the energizing current flowing through the relay coil 38 the associated relay contacts 40, which are in the excitation circuit 42, are moved into closed position as a preparatory step for completing the circuit 42. The sequence of events in the excitation circuit 42 will be discussed hereinafter.

The effect of the current flow through the resistors 24 and 36 is to create the voltage drops $E_{22-33}$ across resistor 24 and $E_{44-33}$ across resistor 36, which voltage drops are shifted in time with respect to phase voltages appearing across the power lines 10 and 9, and 8 and 9. The shifts or displacements, in time, of the voltages $E_{22-33}$ and $E_{44-33}$ are due to the presence of the inductive relay coil 38 and the capacitor 20. The inductance of the relay coil 38, which is in series with the resistor 36, causes the voltage across the resistor 36 to lag the associated phase voltage appearing across the power lines 9 and 10. If this phase voltage be designated $E_{9-10}$, then the resistor voltage drop may be $E_{33-44}$, and in Fig. 2 this voltage $E_{33-44}$ is shown in dotted lines with a shift of 30 degrees from the phase voltage $E_{9-10}$. For reasons that will hereinafter become apparent, the operation of the apparatus may be better described by considering the voltage across the resistor 36 as viewed from the junction point 44 to the junction point 33. This is a voltage displaced 180 degrees from the voltage $E_{33-44}$, and may be designated as the voltage $E_{44-33}$ already referred to above. In Fig. 2 voltage $E_{44-33}$ is represented as a solid line, and its associated phase voltage $E_{10-9}$ (the 180 degree inversion of $E_{9-10}$) is shown as a dotted line.

Similarly, the capacitance of the capacitor 20 which is in series with resistor 24, causes the voltage across the resistor 24 to lead its associated phase voltage appearing across the power lines 8 and 9. In Fig. 2 the voltage $E_{22-33}$ across resistor 24 is shown to be shifted from the phase voltage $E_{8-9}$ by an angle of 30°. It will be noted that the voltages $E_{44-33}$ and $E_{22-33}$ as shown are in phase and of like magnitude so that one vector represents both of these voltages.

While the inductive and capacitive impedances of the coil 38 and capacitor 20, respectively, may vary for particular applications, the preferred impedance values are such as to shift the voltage drop $E_{44-33}$ by an amount of minus 30 degrees with respect to the phase voltage $E_{10-9}$ and to shift the voltage drop $E_{22-33}$ by an amount of plus 30 degrees with respect to the phase voltage $E_{8-9}$, as already shown and described in connection with the vector diagram of Fig. 2. Then, when the applied source voltages impressed on lines 8, 9 and 10 are balanced and properly phased in the rotational sequence of $E_{8-9}$—$E_{9-10}$—$E_{10-8}$ the voltage drops $E_{44-33}$ and $E_{22-33}$ will not only be in phase with one another, but also substantially identical in magnitude at any instant of time. This condition is that illustrated in Figs. 2 and 3. The junction points 44 and 22 will therefore be at the same potential at any instant of time and will oscillate in unison through positive and negative potentials with respect to the junction point 33.

When the rectifiers 26 and 27 are connected as shown in Fig. 1, and the junction points 22 and 44 are at the same potential, the rectifier 27 is precluded from conducting since both of its terminals are at substantially the same potential at all instants of time. Rectifier 26, on the other hand, will conduct when the terminal thereof connected to junction point 22 is at a positive potential with respect to the junction point 33. Thus, during approximately one-half of each cycle rectifier 26 will conduct and thereby establish a current path from the junction point 22 through lead 25, rectifier 26, lead 28, relay coil 29, and lead 32 to the junction point 33. The resulting current flow will energize the coil 29 of relay 30 to close relay contacts 31 in the excitation circuit 42. The net voltage available for energizing coil 29 when the source voltages are balanced and properly phased is shown by the shaded portion under the curve in Fig. 3.

When, however, the phase sequence of the power source is changed, as for example, to $E_{8-9}$—$E_{10-8}$—$E_{9-10}$, the voltage drops $E_{44-33}$ and $E_{22-33}$ are moved 120° out of phase with respect to one another, as shown in the vector diagram of Fig. 4 and the graph of Fig. 5 wherein the effects of rectifier conduction are disregarded. Rectifier 26 will then only be able to conduct during some time interval when both the junction points 44 and 22 are at a positive potential with respect to junction point 33. The period when both junction points 44 and 22 are positive, with respect to junction 33, is shaded in Fig. 5, and as may be observed the magnitude of the potential then available for operation of the relay 30 is quite small as compared to the peak magnitude of either voltage $E_{22-33}$ or $E_{44-33}$.

For all those other periods of time when junction points 22 and 44 are not both positive with respect to junction point 33 the rectifier 26 will be precluded from conducting, and hence there can be no excitation of relay coil 29 during such periods. When the junction point 22 is negative with respect to junction point 33 the rectifier 26 will not conduct, since a back voltage is applied across the rectifier 26. Near the end of this time period when junction point 22 is negative with respect to junction point 33 the potential of junction point 44 will become negative with respect to junction point 22 and the rectifier 27 will conduct. This precedes the time at which the junction point 22 becomes positive with respect to junction point 33, and while the rectifier 27 conducts the current through 27 and necessarily through capacitor 20 causes a large voltage drop across capacitor 20 such that the voltage $E_{22-33}$, as shown in Fig. 5, distorts to an inconsequential value such that there is no current flow through rectifier 26. As the voltage $E_{44-33}$ becomes positive and approaches the $E_{22-33}$ voltage curve shown in Fig. 5, the voltage drop across capacitor 20 decreases and current starts to flow through rectifier 26. As $E_{44-33}$ becomes equal to or greater than $E_{22-33}$, rectifier 27 stops conducting and rectifier 26 conducts the full current. The result is that when the source voltages are of an improper rotational sequence the net voltage available for energizing relay coil 29 is insufficient to close the normally open contacts 31 in the excitation circuit 42.

When the contacts 40 of relay 39 and contacts 31 of relay 30 are moved into closed position, the latter being in response to a correct phase relationship of the voltages as hereinbefore described, the excitation circuit 42 may be made operable by depressing the start push button 46 to energize coil 15 of the line switch 14. Line contacts 11, 12, and 13 are thus moved into closed position whereby the power lines 8, 9 and 10 are connected to input terminals 16, 17, and 18 of the induction motor 19. Contacts 49 of line switch 14 are also moved into closed position to shunt the start button 46 and thereby maintain a closed energizing circuit for the coil 15 after the start button 46 is released. When it is desired to stop the motor 15 the stop push button 45 is depressed, as in usual motor control applications.

A comparison of the voltage available for the energization of coil 29 under normal phase sequence for the source voltages with that available in the event of a phase reversal discloses a ratio of at least 7.5, when the above discussed phase shifting elements are employed. Coil 29 may be suitably chosen with selected pick-up and drop-out voltages so as to cause relay contacts 31 to close under normal source voltage conditions, and to open when a phase reversal occurs. If desired, the relay 30 may be selected with a drop-out voltage such as to allow contacts 31 to remain in closed position, in the event a phase reversal takes place while line switch 14 is energized, until the induction motor 19 is deenergized by operation of the stop button 45. Any subsequent attempt to reenergize the relay 30 to close contacts 31 will be ineffectual, since the reduced voltage available to relay coil 29 during the condition of improper phase sequence will be insufficient to move contacts 31 into closed position.

Though directed primarily to the circuit in Fig. 1, the foregoing discussion relative to phase reversal protection is applicable to each of the circuits illustrated in Figs. 1, 6 and 7. In the circuit of Fig. 6 the reactance coil 53 is selected similarly as the coil 38 of relay 39 in Fig. 1, to provide the desired phase shift for the voltage $E_{44-33}$. The operation of the circuit of Fig. 6 will then be like that of Fig. 1, with the exception that the excitation circuit 42 will require only the closing of relay contacts 31 preparatory to energization of the line switch 14 by operation of the start push button 46, and with the further exception that the voltage source for circuit 42 will be the phase voltage $E_{10-8}$ rather than the supply 43 shown in Fig. 1.

In the circuit of Fig. 7, the voltage $E_{44-33}$ is that appearing across the secondary winding 57 of the transformer 55, which transformer functions in a manner similar to that of resistor 36 in Figs. 1 and 6 which it replaces. For Fig. 7 the voltage source for circuit 42 is again the supply 43 as shown in Fig. 1.

Referring again to the circuit illustrated in Fig. 1, in the event of an open circuit failure in power line 10 the current supplied to relay coil 38 may be sufficiently reduced to cause contacts 40 in the excitation circuit 42 to move into open position. Thus, the excitation supplied to line switch 14 is interrupted and line contacts 11, 12, and 13 are moved to normally open positions to disconnect the protected induction motor 19.

A similar failure in power line 10 may be detected by the circuit illustrated in Fig. 6, since a failure in line 10 essentially eliminates the phase voltage between power lines 8 and 10 which is shown in Fig. 6 to be supplying the exciting voltage for the excitation circuit 42. When this voltage is drastically reduced or entirely eliminated the coil 15 of the line switch 14 is deenergized causing the normally open contacts 11, 12, and 13 to move to open position, again operating to disconnect the protected induction motor 19.

In the circuit illustrated in Fig. 7, an open circuit condition in line 10 causes junction point 44 to be at substantially the same potential as junction point 33 at any instant of time, since only a negligible voltage can be induced in the secondary winding 57 with line 10 open. Also, for the circuit of Fig. 7 the impedance of the coil 29 connected between rectifier 26 and junction point 33 is selected to be greater than the impedance of secondary winding 57 connected between rectifier 27 and junction point 33. With such circuit parameters failure in power line 10 will be detected as follows. During the half cycle when junction points 33 and 44 are positive with respect to junction point 22, rectifier 26 will block current flow through relay coil 29, which is normal operation for such half cycle, and in the following half cycle when junction point 22 is positive with respect to junction points 33 and 44, rectifier 27 will initially conduct to exclude rectifier 26 from conducting, thereby preventing the energization of coil 29. Since contacts 31 will therefore remain open the line switch 14 will be deenergized to disconnect the motor 19.

In the event of an open circuit in line 9 of any of the circuits illustrated in Figs. 1, 6 and 7, the only full phase voltage impressed on the phase shifting networks will be that between power lines 8 and 10. During the resulting half cycles when junction points 33 and 44 are both positive with respect to junction point 22, the rectifiers 26 and 27 will serve to block current flow. During the other half cycles, when the junction points 33 and 44 are both negative with respect to junction point 22, junction point 44 will be at a lower potential than junction point 33 at any instant of time and the rectifier 27 will initially conduct to exclude conduction through rectifier 26. Energization of control relay coil 29 is thereby prevented, and hence the line switch coil 15 in the excitation circuit 42 will be deenergized to disconnect the motor 19.

Upon the occurrence of an open circuit failure in power line 8 of any of the circuits illustrated in Figs. 1, 6 and 7, the only full phase voltage will appear between lines 9 and 10. Consequently, the voltage between junction points 33 and 44 alternates between maximum positive and negative values. When the junction point 44 is positive rectifier 27 will block current flow and when junction point 33 is positive rectifier 26 serves to block current flow. Any variation in the potential level of junction point 22 will be small and will not alter the foregoing operation. Hence, relay coil 29 of relay 30 is deenergized and contacts 31 move into normally open position upon a failure in power line 8, whereby motor 19 will be disconnected from the power source.

The protective circuits illustrated and described may be optimized for any particular application. For example, if the circuit is to be used for phase reversal protection only, the optimum circuit parameters may be such as to shift the voltage $E_{22-33}$ by an amount of plus 60 degrees with respect to the phase voltage $E_{8-9}$, and to shift the voltage $E_{44-33}$ by an amount of minus 60 degrees with respect to the phase voltage $E_{10-9}$. Under such conditions the voltage available for the energization of coil 29 during reversed phase conditions is zero, causing the ratio of voltage available for energizing coil 29 during normal phase rotation conditions to the voltage available during reverse phase conditions to approach infinity.

It is understood that while coil 38 and resistor 37, and capacitor 20 and resistor 24 are herein described as constituting phase shifting networks, various other means may be employed to accomplish this shifting, and that, in general, various changes in the type, size and arrangement of parts may be resorted to without departing from the spirit of the invention, or the scope of the appended claims.

I claim:

1. In a protective circuit for a polyphase system the combination of a first phase shift network adapted to be connected across one phase of a polyphase source to provide a first phase shifted voltage drop; a second phase shift network connected at one end to said first phase shift network and also adapted to be connected across a second phase of a polyphase source to provide a second phase shifted voltage drop; relay means including a coil and contacts operable thereby; a first rectifier; a second rectifier; connections joining said first rectifier and said relay means coil in series across one of said voltage drops, and joining said second rectifier across both said voltage drops; line switch means having a coil and contacts adapted to be joined to a polyphase source; and an energizing circuit for said switch means coil including said relay means contacts.

2. In a protective circuit for a polyphase system the combination of a first phase shift network to be connected across one phase of a polyphase source and including a circuit element adapted to present a first phase shifted voltage; a second phase shift network to be connected across a second phase of a polyphase source and including a second circuit element adapted to present a second phase shifted voltage substantially in phase with said first voltage drop under balanced line voltage conditions of a predetermined sequence; connections joining the first and second circuit elements; a first rectifier; switch means including a coil and contacts operable thereby; said first rectifier and said switch means coil being connected in series across one of the circuit elements; and a second rectifier connected across both of the circuit elements with like terminals of the rectifiers joined to one another whereby current flow through the switch means coil will occur upon substantially in-phase voltages appearing across said circuit elements; said switch means contacts being connected to the polyphase source lines and adapted to close in response to current flow in said switch means coil.

3. A protective circuit for a polyphase system as described in claim 2 in which said circuit elements are resistors.

4. In a protective circuit for a polyphase system the combination of a first phase shifting network including a first phase shifting impedance and a first resistor joined in series and adapted to be connected across one phase of a polyphase source; a second phase shifting network including a second phase shifting impedance and a second resistor joined in series and adapted to be connected across a second phase of a polyphase source; a common connection between said first and second resistors; a first rectifier; relay means including a coil and contacts operable thereby; connections joining said first rectifier and said relay means coil in series across one of said resistors; a second rectifier connected across both of said resistors, with like polarity terminals of the rectifiers being joined to one another; line switch means having a coil and contacts adapted to be connected between a polyphase source and equipment to be operated therefrom; and excitation means joined in series with said switch means coil and said relay means contacts and adapted to furnish an excitation current to the switch means coil when the relay means contacts are closed.

5. A protective circuit for a polyphase system as described in claim 4 in which said first impedance is a capacitor and said second impedance is an inductor.

6. In a protective circuit for a polyphase system the combination of a first phase shifting network including a first phase shifting impedance and a resistor joined in series and adapted to be connected across one phase of a polyphase source; a second phase shifting network including a second phase shifting impedance and a transformer primary winding joined in series and adapted to be connected across a second phase of a polyphase source; a transformer secondary winding having a common connection with said primary winding and said resistor; a first rectifier; relay means including a coil and contacts operable thereby; connections joining said first rectifier and said relay means coil in series across said resistor; a second rectifier; connections joining said second rectifier in series with said transformer secondary winding and across said first rectifier and relay means coil, with like polarity terminals of the rectifiers being joined to one another; line switch means having a coil and contacts adapted to be connected between a polyphase source and equipment to be operated therefrom; and excitation means joined in series with said switch means coil and said relay means contacts and adapted to furnish an excitation current to the switch means coil when the relay means contacts are closed.

7. In a protective circuit for a polyphase system the combination of a first phase shifting network including a capacitor and a first resistor adapted to be connected across one phase of a polyphase source; a second phase shifting network including a current relay coil and a second resistor adapted to be connected across a second phase of a polyphase source; a connection joining said first and second resistors; a first rectifier; control relay means including a coil and contacts operable thereby; connections joining said first rectifier and said relay means coil in series relation across one of said resistors; a second rectifier connected across both of said resistors, with like polarity terminals of said rectifiers being joined to one another; line switch means having a coil and contacts adapted to be connected between a polyphase source and equipment to be operated therefrom; and an excitation circuit for said switch means including a source of excitation connected in series relation with said control relay contacts, contacts operable by said current relay coil, and said line switch means coil.

8. In a protective circuit for a three phase system the combination of a three phase source; a first phase shift network adapted to be connected across one phase of said three phase source to provide a first voltage drop shifted substantially 30 degrees with respect to the associated phase voltage; a second phase shift network adapted to be connected across another phase of said three phase source to provide a second voltage drop shifted substantially 30 degrees with respect to the other phase voltage and shifted substantially 180 degrees out of phase with respect to said first voltage drop; a first rectifier; relay means including a coil and contacts operable thereby; a second rectifier; connections joining said first rectifier and said relay means in series across one of the voltage drops and joining said second rectifier across both of said voltage drops, with like terminals of said rectifiers connected to one another; said relay means adapted to be connected to the power lines of the three phase system.

References Cited in the file of this patent

UNITED STATES PATENTS

| | | |
|---|---|---|
| 1,841,765 | Stansbury et al. | Jan. 19, 1932 |
| 2,486,004 | Clark | Oct. 25, 1949 |
| 2,687,512 | Miller et al. | Aug. 24, 1954 |
| 2,724,782 | Holloway | Nov. 22, 1955 |

FOREIGN PATENTS

| | | |
|---|---|---|
| 129,408 | Australia | Oct. 12, 1948 |